Nov. 9, 1926.  
C. A. PERSONS  
SPRING SADDLE  
Filed July 14, 1926  
1,606,381

Inventor:  
Charles A. Persons  
By  
Attorney

Patented Nov. 9, 1926.

1,606,381

UNITED STATES PATENT OFFICE.

CHARLES A. PERSONS, OF WORCESTER, MASSACHUSETTS, ASSIGNOR TO PERSONS-MAJESTIC MANUFACTURING COMPANY, OF WORCESTER, MASSACHUSETTS, A CORPORATION OF MASSACHUSETTS.

SPRING SADDLE.

Application filed July 14, 1926. Serial No. 122,454.

The invention relates to saddles for motorcycles and bicycles, although adapted also to other uses. The object of the invention is to provide a compound spring saddle, which will be adapted for use with varying loads and yet will not develop excessive rebound.

The saddle of the present invention fulfills these requirements and has good riding qualities under adverse and varying conditions.

The foregoing will more clearly appear after a description of an illustrative embodiment of the invention, such being shown in the accompanying drawings, in which—

Like reference characters refer to like parts in the different figures.

Figure 1:
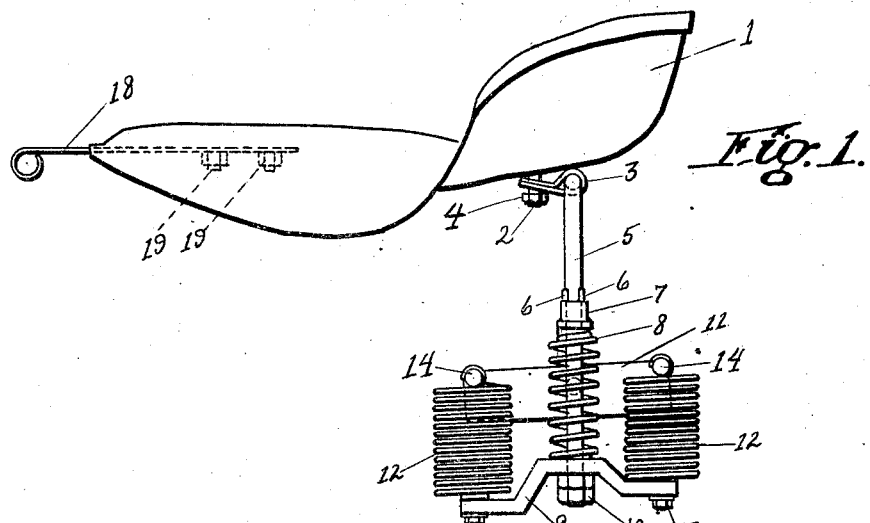
Fig. 1 is a side elevation of a saddle constructed in accordance with my invention.

The saddle proper, which is generally indicated by the numeral 1, is preferably made of pressed steel and shaped as shown in the drawings. The upper part is covered with leather or other fabric, which may be attached in any suitable manner. Underneath the saddle, at opposite sides, are attached, as by riveting, welding, or other suitable process, a pair of threaded bolts 2, 2. Metal clips 3, 3 are received by said bolts, and clamped in place by nuts 4, 4. Through the looped-over portions of said metal clips extends an inverted U-shaped rod 5, which is thus pivotally held by the clips 3, 3. At 6, 6, ears are formed on the rod 5, which act as stops to hold collars 7, 7 from upward movement on the rod. Compression springs 8, 8 extend between the collars 7, 7 and longitudinal offset brackets 9, 9. The two ends of the rod 5 are threaded, and nuts 10, 10 hold the brackets 9, 9 against the springs 8, 8.

Parallel to but above the offset brackets 9, 9, are a pair of longitudinal members 11, 11. Between a bracket 9 and member 11, on each side of the saddle, extend tension springs 12, four in number, with the coils set closely together, as is characteristic of tension springs. The springs 12 are attached to the brackets 9 by means of small bolts and nuts 13, the springs 12 having a central loop which fits beneath the head of said bolts. At the upper end, the springs 12 are attached to the members 11, 11 by bolts and nuts 14 also, the loop in the springs therefor being located on the side, as shown in Fig. 2.

Figure 2:
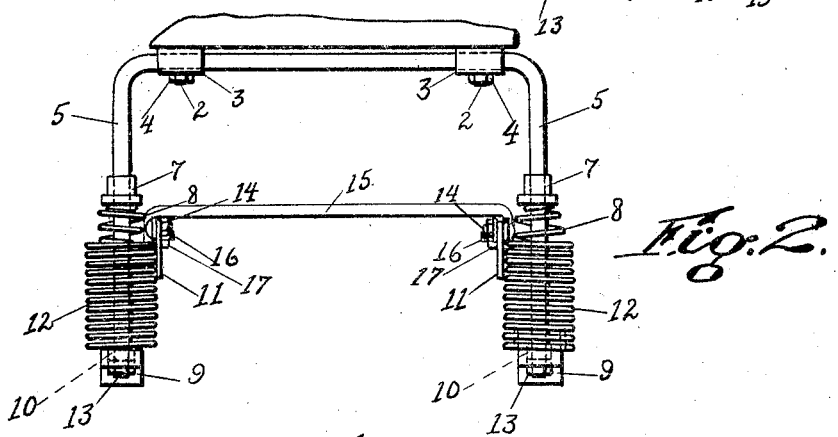
Fig. 2 is a rear elevation of the saddle.

Referring to Fig. 2, the members 11, 11 are connected by a bracket 15, which is turned down at each end, and through which small bolts 16 pass, with securing nuts 17 holding the parts together. Underneath the pommel of the saddle is fastened a piece of strip steel 18, by means of bolts and nuts 19, 19, as shown in dotted lines in Fig. 1. The saddle is attached to the frame of the vehicle by the bracket 15, or one of any usual or desired description, said bracket having a pair of yokes, not shown, for this purpose. Desirably, the piece 18 is independently connected to the vehicle, but, at all events, the weight of the rider rests directly over the springs 8 and 12, and these substantially support the saddle 1. The weight received on the saddle 1 is supported by the rod 5 through the collars 7, which tend to compress the springs 8, 8. This forces the brackets 9, 9 downwardly, which transfer the force to the four opposed tension springs 12.

It will thus be seen that the springs are arranged so that all the weight is received through the two compression springs 8, 8 and then transferred to the four tension springs 12. By this arrangement, owing to the fact that the compression springs cannot spread further than shown in the drawing, and owing to the fact that the tension springs are closely set in their initial position, the rebound of the springs is limited, while their combined tension and compression is almost unlimited. This results in a very easy riding saddle, adapted to give a good ride to a heavy person or a light person, without adjustment. The tension springs normally do most of the work when a light rider is on the saddle, the compression springs coming into play on a severe jounce, or when a heavy person is using the saddle.

Figure 3:
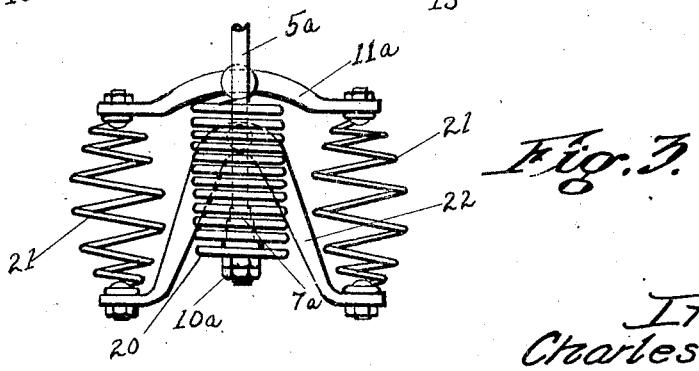
Fig. 3 is a fragmentary side elevation showing a modification of the invention.

Within the scope of the invention, obvious changes may be made without departing from the spirit thereof. For example, instead of utilizing two compression springs and four tension springs, I might employ four compression springs and two tension springs, as shown in the modification of Fig. 3. In said figure, the inverted U-shaped rod is shown at 5ª, to the lower end of which is fastened, by means of nuts 10ª and collar 7ª, a tension spring 20. The latter surrounds the rod 5ᵃ, and is fastened to a longitudinal member 11ᵃ which, the same as the longitudinal members 11, is located inside the upright portions of the member 5ᵃ.

At the extremities of the member 11ᵃ, compression springs 21, 21 are concentrically fastened. The lower ends of said compression springs are concentrically fastened to a generally U-shaped bracket member 22. The central upper portion of the latter is attached to a piece of strip steel, not shown, similar to the piece 15. The above description applies, of course, only to one side of the spring support, the parts being duplicated on the other side as in the case of the modification of Figs. 1 and 2.

Further variations or reversals of parts may be made, the scope of the invention being set forth in the following claims.

I claim:—

1. In a device of the class described, a saddle, downwardly extending rods pivotally connected to the under portion of said saddle, springs surrounding said rods, said springs receiving the weight on said saddle, a pair of springs on either side of said first named springs, longitudinal members transferring the weight from said first named springs to said second named springs, a second set of longitudinal members connected to the vehicle on which said saddle is mounted, said last named springs being also connected to said last named longitudinal members, whereby the load is carried through both of said sets of springs.

2. In a device of the class described, a saddle, a U-shaped rod pivotally connected to the under portion of said saddle thus providing a pair of downwardly extending portions, springs surrounding said portions, said springs receiving the weight on said saddle, a pair of springs on either side of said first named springs, longitudinal members transferring the weight from said first named springs to said second named springs, a second set of longitudinal members connected to the vehicle on which said saddle is mounted, said last named springs being also connected to said last named longitudinal members.

3. In a device of the class described, a saddle, downwardly extending rods pivotally connected to the under portion of said saddle, springs surrounding said rods, said springs receiving the weight on said saddle, a pair of springs on either side of said first named springs, longitudinal members transferring the weight from said first named springs to said second named springs, a second set of longitudinal members connected to the vehicle in which said saddle is mounted, said last named springs being also connected to said last named longitudinal members, one of said sets of springs being of the compression type, and the other of said sets of springs being of the tension type, the load being carried through both sets of springs, thus reducing the amount of rebound.

4. In a device of the class described, a saddle, a downwardly extending rod supporting the weight on said saddle, a spring surrounding said rod, one end of said spring being concentrically fastened to said rod and the other end of said spring being fastened to a longitudinal member, a second longitudinal member generally parallel to said first longitudinal member, and a pair of springs transferring the load from said first longitudinal member to said second longitudinal member, the second longitudinal member being connected to the frame of the vehicle on which said saddle is mounted.

5. In a device of the class described, a saddle, a U-shaped rod pivotally connected to the under portion of said saddle, thus providing a pair of downwardly extending portions, a pair of longitudinal members located inside said U-shaped member, springs surrounding said U-shaped rod, and springs extending between the ends of said longitudinal members, whereby to support the load on said saddle, first, through said springs surrounding the downwardly extending portions of said U-shaped rod, thence through said second named springs, said saddle supporting means being characterized by great resiliency with lack of rebound.

Dated this 13th day of July, 1926.

CHARLES A. PERSONS.